United States Patent
Hirschsohn et al.

(10) Patent No.: US 11,008,460 B2
(45) Date of Patent: May 18, 2021

(54) FLAME-RETARDED POLYAMIDE COMPOSITION

(71) Applicant: ICL-IP AMERICA INC., Tarrytown, NY (US)

(72) Inventors: Yaniv Hirschsohn, Rehovot (IL); Shay Dichter, Meitar (IL); Eyal Eden, Shoham (IL); Sergei Levchik, Croton on Hudson, NY (US)

(73) Assignee: ICL-IP AMERICA INC., Tarrytown, NY (US)

( * ) Notice: Subject to any disclaimer, the term of this patent is extended or adjusted under 35 U.S.C. 154(b) by 61 days.

(21) Appl. No.: 16/322,572

(22) PCT Filed: Aug. 24, 2017

(86) PCT No.: PCT/US2017/048318
§ 371 (c)(1),
(2) Date: Feb. 1, 2019

(87) PCT Pub. No.: WO2018/044664
PCT Pub. Date: Mar. 8, 2018

(65) Prior Publication Data
US 2019/0185669 A1 Jun. 20, 2019

Related U.S. Application Data

(60) Provisional application No. 62/380,757, filed on Aug. 29, 2016.

(51) Int. Cl.
| | |
|---|---|
| *C08K 5/02* | (2006.01) |
| *C08L 77/06* | (2006.01) |
| *C08K 5/00* | (2006.01) |
| *C08K 5/52* | (2006.01) |
| *C08K 5/523* | (2006.01) |
| *C08K 7/14* | (2006.01) |
| *C08K 5/51* | (2006.01) |
| *C08K 5/03* | (2006.01) |
| *C08L 27/18* | (2006.01) |
| *C08L 63/00* | (2006.01) |

(52) U.S. Cl.
CPC ............ *C08L 77/06* (2013.01); *C08K 5/0066* (2013.01); *C08K 5/03* (2013.01); *C08K 5/51* (2013.01); *C08K 5/52* (2013.01); *C08K 5/523* (2013.01); *C08K 5/5205* (2013.01); *C08K 7/14* (2013.01); *C08L 27/18* (2013.01); *C08L 63/00* (2013.01); *C08L 2201/02* (2013.01); *C08L 2203/20* (2013.01)

(58) Field of Classification Search
CPC ....... C08L 77/00; C08L 2201/02; C08K 5/49; C08K 3/32; C08K 5/0066; C08K 3/016
See application file for complete search history.

(56) References Cited

U.S. PATENT DOCUMENTS

| | | | |
|---|---|---|---|
| 6,031,032 A | 2/2000 | Horacek et al. | |
| 6,366,071 B1 | 4/2002 | Jenewein et al. | |
| 6,579,911 B1* | 6/2003 | Vo | C08K 5/523 521/85 |
| 2004/0138351 A1* | 7/2004 | Kaprinidis | C08K 5/0066 524/100 |
| 2005/0004277 A1 | 1/2005 | Hoerold et al. | |
| 2011/0034597 A1* | 2/2011 | Moy | C07F 9/12 524/127 |
| 2012/0123007 A1* | 5/2012 | Hini | C08K 5/0066 521/146 |
| 2013/0260626 A1* | 10/2013 | Stowell | D06M 13/244 442/141 |

FOREIGN PATENT DOCUMENTS

| | | |
|---|---|---|
| CN | 102775747 A | 11/2012 |
| EP | 0129825 A2 | 1/2015 |
| GB | 2508601 A | 6/2014 |
| WO | 2012088080 A1 | 6/2012 |

OTHER PUBLICATIONS

Lassen et al "Survey of brominated flame retardants", The Danish Environmental Protection Agency, Published on Dec. 2014.*
International Search Report and Written Opinion from PCT/US2017/048318 dated Nov. 14, 2017.
Chinese Office Action from Chinese Application No. 2017800521231 dated Sep. 1, 2020.
European Office Action from European Application No. 17 764 705.4 dated May 15, 2020.

* cited by examiner

*Primary Examiner* — Gregory Listvoyb
(74) *Attorney, Agent, or Firm* — Dilworth & Barrese, LLP

(57) ABSTRACT

There is provided herein a flame retarded polyamide composition comprising: (a) at least one polyamide; (b) a hydroquinone bisdiphenyl phosphate ester of the general formula (I): wherein $R^1$, $R^2$, $R^3$ and $R^4$ each independently is aryl, or arylalkyl each independently containing up to about 30 carbon atoms, optionally interrupted with heteroatoms, X is a divalent hydroquinone group, containing up to about 20 carbon atoms, and n has an average value of from about 1.0 to about 2.0; and, (c) at least one brominated flame retardant and optionally, melamine polyphosphate.

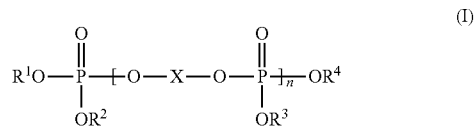

(I)

20 Claims, No Drawings

FLAME-RETARDED POLYAMIDE COMPOSITION

This application claims priority to U.S. provisional application No. 62/380,757 filed on Aug. 29, 2016, the contents of which are incorporated by reference herein in their entirety.

FIELD OF THE INVENTION

The present invention relates to flame-retarded polyamide compositions, methods of making the same, and articles containing the same.

BACKGROUND OF THE INVENTION

Glass reinforced or non-reinforced thermoplastic polyamides are used for the production of electronic parts such as connectors, frames, moving parts, transformers, micro motors, amongst others. In most of these applications, flame retardancy is needed and is usually provided by flame retardant systems based on a combination of brominated flame retardants with antimony trioxide as synergist.

But this type of flame retardant system has limitations, because antimony trioxide, being a very efficient synergist, tends to significantly increase the smoke yield, which impairs visibility and creates problems for evacuation of people in the case of fire. Furthermore, antimony trioxide has a very high bulk density which increases the specific gravity of molded parts. This is especially undesirable in transportation and aviation. Even furthermore, antimony trioxide has significantly increased in price in recent years. Still further, some recently introduced ecolabels require elimination of antimony trioxide from thermoplastic parts.

Although there is a clear need for low antimony trioxide or antimony trioxide free flame retardant plastics, such usually requires a significant increase in the loading of brominated flame retardant.

While some phosphorus-containing materials have been used such as the aluminum salt of diethylphosphinic acid (DEPAL), it has still resulted in various processing issues such as corrosion of extruder screws, lower flow, more difficult moldability, longer injection molding times, poor recyclability, poor mechanical and thermal properties and less than desirable ageing resistance.

SUMMARY OF THE INVENTION

It has been unexpectedly discovered herein that a combination of hydroquinone bisdiphenyl phosphate ester, and at least one of brominated flame retardant and optionally, melamine polyphosphate (MPP), provides a flame retardant additive for thermoplastic polyamides, preferably glass-reinforced polyamide-6,6, providing flame retardant efficiency adequate to thermoplastic polyamide resins in electrical and electronic applications without requiring the use of antimony trioxide.

The present invention is directed to a flame retarded polyamide composition comprising:
(a) at least one polyamide;
(b) a hydroquinone bisdiphenyl phosphate ester of the general formula (I):

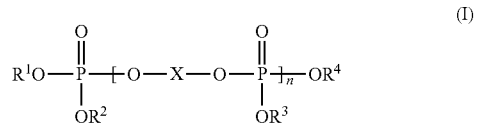

wherein $R^1$, $R^2$, $R^3$ and $R^4$ each independently is aryl, or arylalkyl each independently containing up to about 30 carbon atoms, optionally interrupted with heteroatoms, X is a divalent hydroquinone group, containing up to about 20 carbon atoms, and n has an average value of from about 1.0 to about 2.0; and,
(c) at least one brominated flame retardant and optionally, melamine polyphosphate.

Further, the present invention is directed to a method of making the flame retarded polyamide composition which comprises blending the polyamide (a), e.g., polyamide-6,6, hydroquinone bisdiphenyl phosphate ester (b), and at least one of a brominated flame retardant and optionally, MPP.

Still further, the present invention is also directed to an article, e.g., a molded part comprising polyamide, glass fiber, hydroquinone bisdiphenyl phosphate ester (b), at least one of a brominated flame retardant and optionally, MPP, and further optionally, at least one of an antidripping agent, filler(s) other than glass fiber, impact modifiers, antioxidants, lubricants, processing aids, and colorants, made by the aforementioned method.

The present invention can in one non-limited embodiment comprise, consist essentially of, or consist of components (a)-(c) and optionally MPP, as described herein.

DETAILED DESCRIPTION OF THE INVENTION

The use of the present invention herein, especially as regards the use of hydroquinone bisdiphenyl phosphate ester (b) of the general formula (I), has provided similar plasticizing effect to that of DEPAL in that hydroquinone bisdiphenyl phosphate ester (b) maintains mechanical and thermal properties, and maintains the same flow properties as compared to DEPAL with additional additives.

The at least one polyamide (a), as used herein, is intended to include any polymeric thermoplastic material containing amide groups in the main chain. More particularly, the polyamide (a) is, in a preferred embodiment, any thermoplastic polyamide manufactured by any known method, including the polymerization of a monoamino monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above, together with substantially equimolar proportions of a diamine and a dicarboxylic acid. The dicarboxylic acid may be used in the form of a functional derivative thereof, for example, a salt, an ester or acid chloride.

In another embodiment herein the flame retarded polyamide composition can comprise one or more than one polyamide, e.g., a blend of a few polyamides.

Suitable polyamide components include at least one of polyamide-6, polyamide-6,6, polyamide-11, polyamide-12, polyamide-4,6, polyamide-6,10 and polyamide-6,12, as well as polyamides prepared from terephthalic acid and/or isophthalic acid and trimethylhexamethylenediamine; polyamides prepared from adipic acid and m-xylylenediamines; polyamides prepared from adipic acid, azelaic acid, and 2,2-bis-(p-aminocyclohexyl) propane, and polyamides prepared from terephthalic acid and 4,4'-diaminodicyclohexylmethane. Mixtures and/or copolymers of two or more of the foregoing polyamides or prepolymers thereof, respectively, can also be used herein.

In one specific embodiment herein the polyamide can be selected from the group consisting of polyamide-6; polyamide 6,6; polyamide 11, polyamide 12 and combinations thereof, with the more specific polyamide being at least one of polyamide-6,6 and polyamide 6. In one embodiment herein, the most specific polyamide is polyamide-6,6.

In one embodiment herein the thermoplastic polyamide (a) herein can be present in an amount of from about 30 to about 90 weight percent based on the total weight of the flame retarded polyamide composition.

When blends of polyamides are employed the polyamide component (a) can comprise from about 1 to about 99 parts by weight of one polyamide and from about 99 to about 1 part by weight of a different polyamide based on 100 parts by weight of both polyamide components combined.

In one embodiment, the hydroquinone bisdiphenyl phosphate ester (b) of the general formula (I) can be such that wherein $R^1$, $R^2$, $R^3$ and $R^4$ each independently is aryl, or arylalkyl each independently containing up to about 30 carbon atoms, preferably up to 12 carbon atoms, optionally interrupted with heteroatoms, X is a divalent hydroquinone group, containing up to about 20 carbon atoms, and n has an average value of from about 1.0 to about 2.0.

In one aspect of the present invention, phosphates within general formula (I), wherein n has an average value of about 1.0 to about 1.1 and X is hydroquinone, are in the form of free-flowing powders. Typically, but not limited thereto, "free-flowing powder" as applied to the phosphates of formula I have average particle sizes of about 10 um to about 80 um. These free-flowing powders, when compounded with thermoplastics, avoid various handling problems as well as impart improved thermal properties such as, resin flow.

In the general, the hydroquinone bis-phosphates of the present invention are prepared by reacting a diaryl halophosphate with hydroquinone in the presence of a catalyst. In a preferred embodiment of the invention, diphenylchlorophosphate (DPCP) is reacted with hydroquinone in the presence of $MgCl_2$ to produce hydroquinone bis-(diphenylphosphate) (HDP). In accordance with the present invention, hydroquinone bis (diphenylphosphate) within general formula (I) prepared by this process will have an average n value of about 1.1 or less.

The component (c) as used herein in the flame retarded polyamide composition can comprise at least one brominated flame retardant, and in another embodiment herein, the flame retarded polyamide composition can also further optionally comprise, MPP. In one specific embodiment, the component (c) is at least one brominated flame retardant, e.g., a brominated polystyrene such as FR-803P and/or a brominated epoxy polymer e.g., F-2400, or F-3100 (all of which are available from ICL-IP America, Inc.) or a decabromodiphenylethane such as FR-1410 also available from ICL-IP America, Inc., and in such formulations of the flame retarded polyamide composition the composition may be in the absence of MPP, although MPP can also be present. In another specific component, the flame retarded polyamide composition contains components (a)-(c) and also contains MPP. In one specific embodiment herein, the flame retarded polyamide composition can comprise components (a)-(c) and no MPP.

The component (c) of the polyamide composition can comprise at least one brominated flame retardant, i.e., any known brominated flame retardants such as the non-limiting examples of brominated polystyrene, polydibromo styrene, polytribromo styrene, polypentabromo styrene, decabromodiphenylethane, tetrabromodecabromodiphenoxybenzene, ethylenebistetrabromophthalimide, 2-ethylhexyl tetrabromophthalate ester, hexabromodiphenyl ether, octabromodiphenyl ether, decabromodiphenyl ether, tetrabromobisphenol A, tetrabromobisphenol A bis (2,3,-dibromopropyl ether), tris(tribromophenoxy)triazine, tris(tribromoneopentyl) phosphate, tetrabromodiphenyl sulfide, tetrabromobisphenol S bis(2,3-dibromopropyl ether), brominated polyacrylates such as poly(pentabromobenzyl acrylate), bis (tribromophenoxy)ethane, poly-dibromophenylene oxide, brominated phenoxy resin, epoxy terminated brominated phenoxy resins, end-capped brominated epoxy polymers sold under F-3000 series, brominated polycarbonate, phenoxy-terminated carbonate oligomer of tetrabromobisphenol A, and combinations thereof. The brominated polystyrenes such as polydibromostyrene are prepared by brominating polystyrene or poly(α-methylstyrene), or by polymerizing brominated styrene or brominated α-methylstyrene.

The at least one brominated flame retardant can in one embodiment herein be a polymeric brominated flame retardant, such as a polymeric brominated epoxy polymer. In another embodiment herein, the at least one brominated flame retardant can be decabromodiphenylethane. In yet another embodiment herein, the at least one brominated flame retardant can be a brominated polystyrene.

Specifically, suitable examples of at least one brominated flame retardant component (c), include flame retardant compounds of the following formulae:

Decabromodiphenyl ether sold under the trade name FR-1210

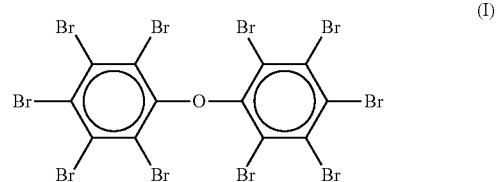

(I)

Tetrabromobisphenol A sold under the trade name FR-1524

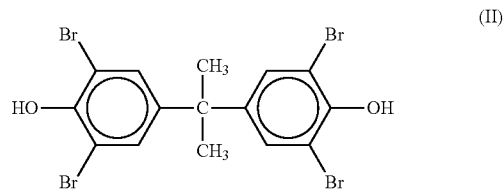

(II)

Tetrabromobisphenol A bis (2,3-dibromopropyl ether) sold under the trade name FR-720

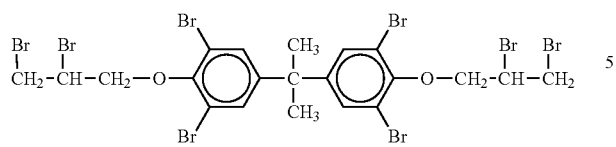
(III)
Tris(tribromophenoxy)triazine sold under the trade name FR-245
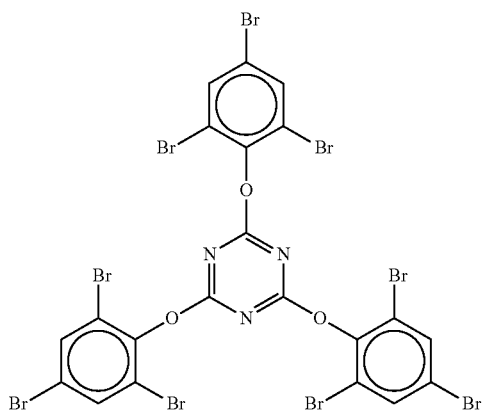
(IV)
Tris(tribromoneopentyl) phosphate sold under the trade name FR-370
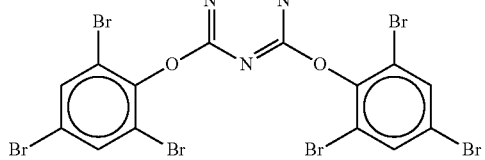
(V)
Poly(pentabromo benzyl acrylate) sold under the trade name FR-1025
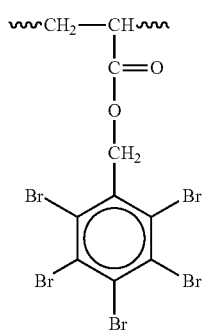
(VI)
Brominated polystyrene sold under the trade name FR-803P
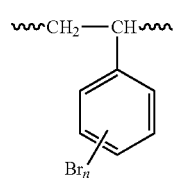
(VII)
Epoxy-terminated brominated phenoxy resins sold under the trade name F-2000 series
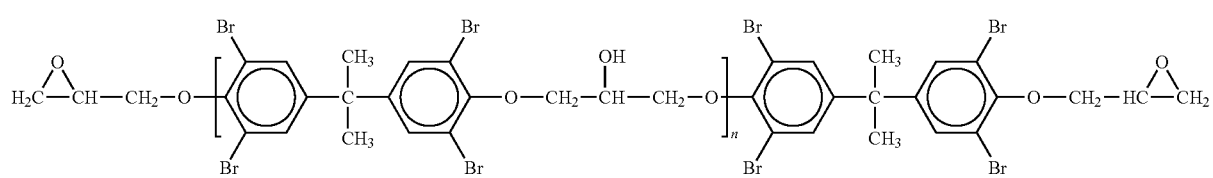
(VIII)

End capped brominated epoxy polymers sold under the trade name F-3000 series

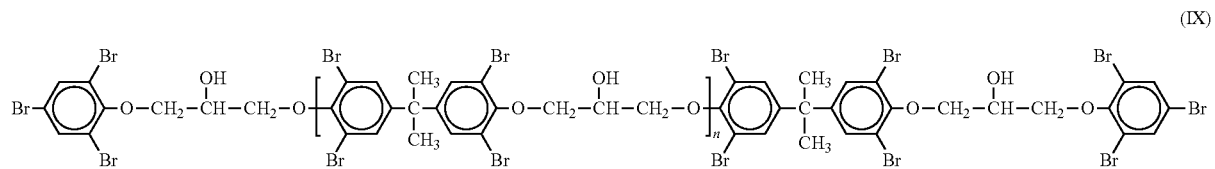

(IX)

Phenoxy-terminated carbonate oligomer of tetrabromo-bisphenol A

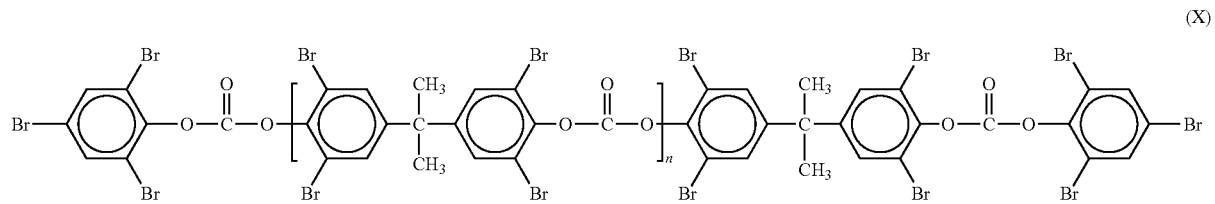

(X)

Decabromodiphenylethane

Tetrabromobisphenol S bis (2,3-dibromopropyl ether)

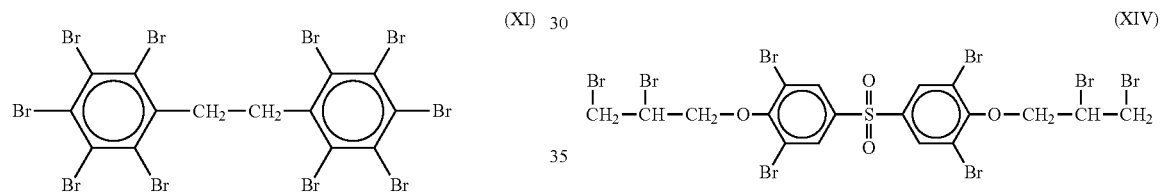

(XI) (XIV)

Tetrabromodecabromodiphenoxybenzene

Poly-dibromophenylene oxide

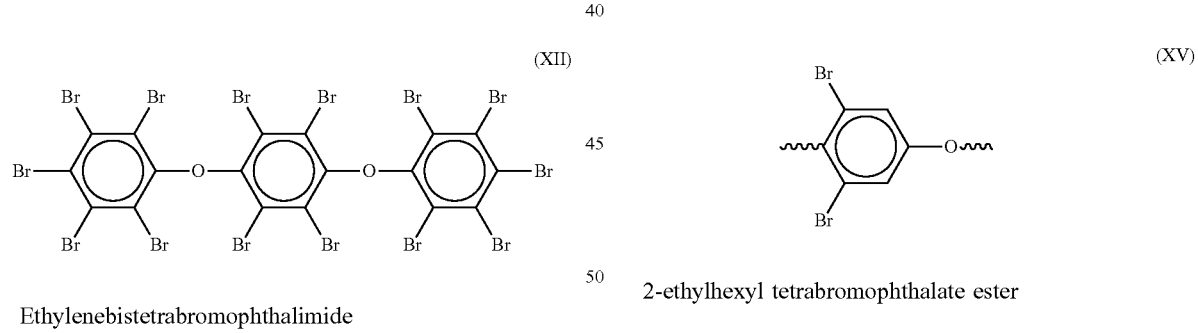

(XII) (XV)

2-ethylhexyl tetrabromophthalate ester

Ethylenebistetrabromophthalimide

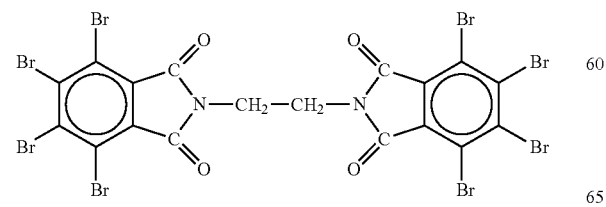 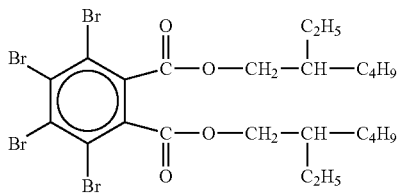

(XIII) (XVI)

Bis (tribromophenoxy) ethane (XVII)

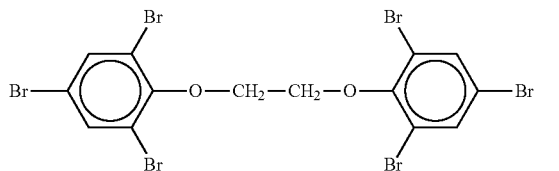

In one specific embodiment herein the component (c) of the polyamide composition, is a brominated polystyrene sold under the trade name FR-803P available from ICL-IP America.

In one embodiment, the component (c) is a brominated epoxy polymer flame retardant such as F-2400 available from ICL-IP America, Inc.

In one embodiment herein the MPP component is available from BASF.

The flame retarded polyamide composition can further comprise one or more optional components such as anti-dripping agents, filler(s) e.g. glass fiber, antioxidants, lubricants, processing aids, and colorants.

Anti-dripping agents prevent or retard the polyamide resin from dripping while the resin is subjected to burning conditions. Specific examples of such agents include silicone oils, silica (which also serves as a reinforcing filler), and fibrillating-type fluorine-containing polymers. Some non-limiting examples of fluorine-containing polymers include fluorinated polyolefins such as poly(tetrafluoroethylene), tetrafluoroethylene/hexafluoropropylene copolymers, tetrafluoroethylene/ethylene copolymers, poly(vinylidene fluoride), poly(chlorotrifluoroethylene), and the like, and mixtures comprising at least one of the foregoing anti-dripping agents.

A preferred anti-dripping agent is poly(tetrafluoroethylene) encapsulated by a styrene-acrylonitrile (SAN) copolymer. When used, an anti-dripping agent is present in an amount of 0.02 to 2 weight percent, and more specifically from 0.05 to 1 weight percent, based on the total weight of the composition.

In one embodiment, the antidripping agent can be polytetrafluoroethylene (PTFE). This is commercially available in various product qualities. These include additives such as Hostaflon® TF2021 or PTFE blends, such as Metablen® A-3800 (approx. 40% PTFE CAS 9002-84-0 and approx. 60% methyl methacrylate/butyl acrylate copolymer CAS 25852-37-3 from Mitsubishi-Rayon) or Blendex® B449 (approx. 50% PTFE and approx. 50% SAN [of 80% styrene and 20% acrylonitrile]) from Chemtura. Blendex® B449 is preferably used.

An inorganic filler of the present invention may be added to the flame retarded polyamide composition for the purpose of reducing the molding shrinkage coefficient and linear expansion coefficient of a resultant molded article and improving high and low heat shock property, and various fillers in the form of fiber or non-fiber (e.g., powder, plate) may be used depending on the desired article. Some examples of fibrous filler, which are types of inorganic filler, may be those such as, glass fiber, glass fiber having a non-circular cross section such as flat fiber, carbon fiber, silica fiber, silica•alumina fiber, zirconia fiber, boron nitride fiber, silicon nitride fiber, boron fiber, potassium titanate fiber, and further, metal fibrous substances such as stainless, aluminum, titanium, copper and brass.

Particularly, the typical fibrous filler is glass fiber or carbon fiber. On the other hand, the inorganic filler may be a powdery filler, such as carbon black, silica, quartz powder, glass bead, glass powder, calcium silicate, kaolin, talk, clay, diatomaceous earth, silicates such as wollastonite, metal oxides such as iron oxide, titanium oxide, zinc oxide and alumina, metal carbonates such as calcium carbonate and magnesium carbonate, metal sulfates such as calcium sulfate and barium sulfate, and in addition, silicon carbide, silicon nitride, boron nitride and various metal powders.

Another example of inorganic filler may be plate-like filler such as, mica, glass flake and various metal foils. These inorganic fillers can be used alone or in combination of two or more. When these inorganic fillers are used, they are desirably treated previously with a sizing agent or surface treatment agent, if necessary. In one specific embodiment, the filler can be glass fiber alone, or in combination with one or more of the other fillers described herein.

The amount of the inorganic filler in the polyamide flame retardant composition may be from 1 to 50% by weight, preferably from 10 to 45% by weight and most preferably from 20 to 40% by weight. When the amount is too low, the effect for improving heat shock resistance is low, and when too high, molding work becomes difficult.

The polyamide flame retardant composition may also further comprise impact modifiers such as elastomers and core-shell polymers. These elastomers can be thermoplastic elastomers, which can be melt-mixed with thermoplastic polyamide resin (a) because they are solids having rubber-like elasticity at normal temperature, but heating them decreases the viscosity thereof. The specific thermoplastic elastomer used is not particularly restricted, and olefin-, styrene-, polyamide-(other than component (a)), and urethane-based elastomers may be used as non-limiting examples.

A core shell polymer is a core shell type graft copolymer having a multi-layer structure and preferably in which a rubber layer having an average particle size of 1.0 μm or less is wrapped with a vitreous resin. The rubber layer of the core shell type copolymer has an average particle size of 1.0 μm or less, and preferably from 0.2 to 0.6 μm. If the average particle size of the rubber layer is over 1.0 μm, the effect for improving impact resistance property may be insufficient. As the rubber layer of this core shell type copolymer, those obtained by copolymerization/graft copolymerization of at least one of a silicon-based, diene-based or acrylic elastomer can be used.

Other optional ingredients typically employed in amounts less than 10 percent by weight of the antimony trioxide free flame retardant polyamide composition, preferably less than 5 percent by weight, include non-limiting examples such as lubricants, heat stabilizers, and other additives used to enhance the properties of the resin.

Typically, transesterification inhibitors are used in amounts from 0.01 percent to 0.5 percent by weight and include monozinc phosphate, zinc phosphate, or other types of inhibitors. Conventional stabilizer additives may be preferably utilized in amounts from 0.01 to 5 percent by weight of the total polyamide flame retarded composition and include examples such as hindered phenols and antioxidants.

In one embodiment herein the polyamide flame retardant composition comprises polyamide (a) in an amount of from about 40 to about 90 weight percent; hydroquinone bisdiphenyl phosphate (b) of the general formula (I) in an amount of from about 5 to about 30 weight percent; the brominated flame retardant component (c), in total amount of from 1 to about 30 weight percent, and MPP when optionally present is present in an amount of from about 1 to about 10 weight percent; and, the antidripping agent in an amount of from about 0.02 to 2 weight percent all based on the total weight of the polyamide flame retardant composition.

In a more specific embodiment, the polyamide flame retardant composition comprises polyamide (a) in an amount of from about 40 to about 90 weight percent; hydroquinone bisdiphenyl phosphonate (b) of the general formula (I) in an amount of from about 5 to about 30 weight percent; the brominated flame retardant component (c), in total amount of from 1 to about 30 weight percent, and MPP when optionally present is present in an amount of from about 1 to about 10 weight percent; and, the antidripping agent in an amount of from about 0.05 to 1 weight percent, all based on the total weight of the polyamide flame retardant composition; and, inorganic filler in an amount of from about 10 to about 35 weight percent said weight percents being based on the total weight of the polyamide flame retardant composition.

These amounts of flame retardant additives (b), (c), and inorganic filler in the polyamide flame retardant thermoplastic composition are flame retardant effective amounts thereof.

The polyamide flame retardant thermoplastic composition herein can have a flame retardancy classification of one or more of HB, V-2, V-1, V-0 and 5VA according to UL-94 protocol. In one embodiment, the polyamide flame retardant composition can have a flame retardancy of at least V-1 or V-0.

The method of blending the compositions of this invention is not critical and can be carried out by conventional techniques. One convenient method comprises blending the polyamide (a) and other ingredients (b) and (c), and optionally MPP, optionally in powder or granular form, extruding the blend and comminuting the blend into pellets or other suitable shapes.

Although it is not essential, best results are obtained if the ingredients are precompounded, pelletized and then molded. Precompounding can be carried out in conventional equipment. For example, after carefully predrying the polyamide resin (a), other ingredients, and, optionally, other additives and/or reinforcements, a single screw extruder is fed with a dry blend of the composition, the screw employed having a long transition section to insure proper melting. On the other hand, a twin-screw extrusion machine e.g., a ZE25 with L/D=32 ex Berstorff extruder can be fed with resins and additives at the feed port and have reinforcement downstream. In either case, a generally suitable machine temperature will be about 220° to 320° C.

The precompounded composition can be extruded and cut or chopped into molding compounds, such as conventional granules, pellets, etc. by standard techniques.

The polyamide flame retardant composition can be molded in any equipment conventionally used for thermoplastic compositions. For example, good results will be obtained in an injection molding machine, e.g. of the Arburg 320S Allrounder 500-150 type, at conventional temperatures, e.g., 230 to 270 degrees Centigrade. If necessary, depending on the molding properties of the polyamide (a), the amount of additives and/or reinforcing filler and the rate of crystallization of the polyamide component (a), those skilled in the art will be able to make the conventional adjustments in molding cycles to accommodate the composition.

In another embodiment herein there is provided a molded article comprising the polyamide flame retardant composition, preferably where the molded article is made by injection molding.

In one embodiment, the molded article has a thickness of 0.8 mm or 0.4 mm and a flame retardancy of V-0.

In another embodiment, the molded article has a melt flow index (MFI) of from 10-50, preferably 15-50, more preferably 15-40 and most preferably from 20-40 as determined by ASTM D 1238 270C/1.2 kg.

The polyamide flame retardant composition of the present invention is useful, for example, in the production of electronic components, such as for example, connectors, frames, moving parts, transformers and micromotors, and the like.

In a specific embodiment herein there are provided injection molded components, e.g., electronic components, comprising a polyamide polymer (a), hydroquinone bisdiphenyl phosphate (b), at least one brominated flame retardant (c), optionally, MPP and antidripping agent, and optionally, glass fiber.

In another embodiment, there is provided a flame retarded article, e.g., an electronic component, preferably an injection molded electronic component, as described herein, made by the above-described method.

The following examples are used to illustrate the present invention.

Examples

The subject examples evaluate the flammability at 1.6, 0.8 and 0.4 mm thicknesses and in addition, mechanical properties were also evaluated.

Materials:
The materials used in this study are presented in Table 1.
Compounding:
Compounding was performed in a twin-screw co-rotating extruder ZE25 with L/D=32 ex Berstorff.
The extruded strands were pelletized in pelletizer 750/3 ex Accrapak Systems Limited.
The obtained pellets were dried in a circulating air oven ex Heraeus Instruments at 110° C. for 3 hours.
Injection Molding:
Test specimens were prepared by injection molding in Allrounder 500-150 ex. Arburg.
Conditioning:
Specimens were conditioned at 23° C. for a week.
Tests:
Test methods are presented in Table 2.

TABLE 1

| | Materials | |
|---|---|---|
| Trade Name | Component | Function |
| Polynil ® P50FL ex NILIT | Polyamide-6,6 | plastic matrix |
| GF Chop Vantage 3660 ex PPG | Glass fiber | Reinforcing agents |

TABLE 1-continued

Materials

| Trade Name | Component | Function |
|---|---|---|
| FR-803P ex ICL-IP | Brominated Polystyrene | FR |
| F-2400 ex ICL-IP | Brominated Epoxy polymer | FR |
| MO-0012 ex Kafrit | Aluminum trioxide MB 80% | Synergist |
| HDP ex ICL-IP | Hydroquinone bis(diphenylphosphate) | Synergist/FR |
| Melapur ® 200 ex BASF | MPP | Synergist/FR |
| Exolit ® 1240 ex Clariant | DEPAL | Synergist/FR |
| Exolit 1312 ex Clariant | DEPAL + additives | Synergist/FR |
| Exolit 1314 ex Clariant | DEPAL + additives | Synergist/FR |
| Acrawax ® C ex Lonza | N, N' Ethylene Bisstearamide | Lubricant |
| Irganox ® b1171 (ex BASF) | N, N'-hexane-1, 6-diylbis [3-(3, 5-di-tert-butyl-4-hydroxyphenyl) propionamide] mix | Antioxidant |
| Ca stearate (ex BASF) | Ca-stearate | Lubricant |

TABLE 2

Test methods

| PROPERTY | METHOD | APPARATUS |
|---|---|---|
| UL-94 V | Flammability vertical burning test Thickness 0.4, 0.8 & 1.6 mm. | Flammability hood as recommended by UL94V |
| Notched Izod impact energy | ASTM D-256-81 | INSTRON CEAST 9050 Pendulum Impact system |
| Tensile properties | ASTM D638-95 V = 5 mm/min | Zwick 1435 material testing machine |
| HDT | Heat distortion test ASTM D648. Load 1820 kPa; | HDT/VICAT-plus Davenport, Lloyd instruments |
| MFI-melt flow index | ASTM D 1238 270 C./1.2 kg | Meltflixer 2000 ex. Thermo Hake. |
| GWIT | Glow wire ignition temperature according to CEI EN 60695-2-13/11. | PTL Dr. Grabenhorst apparatus. |

TABLE 3

Compositions of Polyamide-6,6 & FR-803P & Synergists
(Summary of Flame-retardancy and Evaluation of Mechanical Properties)

| | Units | ATO-ref | | MPP | | MPP + HDP | | Exolit 1314 | | Exolit 1312 | |
|---|---|---|---|---|---|---|---|---|---|---|---|
| Polynil P50FL | % | 44.70 | 43.40 | 45.70 | 44.70 | 45.70 | 44.70 | 45.70 | 44.70 | 45.70 | 44.70 |
| GF Chop Vantage 3660 ex PPG | % | 30 | 30 | 30 | 30 | 30 | 30 | 30 | 30 | 30 | 30 |
| FR-803P | % | 19.7 | 19.7 | 19.7 | 19.7 | 19.7 | 19.7 | 19.7 | 19.7 | 19.7 | 19.7 |
| ATO (MB 80%) | % | 5.0 | 6.3 | | | | | | | | |
| HDP | | | | | | 2.0 | 2.5 | | | | |
| MPP | | | | 4.0 | 5.0 | 2.0 | 2.5 | | | | |
| Exolit 1314 | | | | | | | | 4.0 | 5.0 | | |
| Exolit 1312 | | | | | | | | | | 4.0 | 5.0 |
| Acrawax C ex. Lonza | % | 0.2 | 0.2 | 0.2 | 0.2 | 0.2 | 0.2 | 0.2 | 0.2 | 0.2 | 0.2 |
| Irganox B1171 ex Ciba | % | 0.2 | 0.2 | 0.2 | 0.2 | 0.2 | 0.2 | 0.2 | 0.2 | 0.2 | 0.2 |
| Ca-stearate | % | 0.2 | 0.2 | 0.2 | 0.2 | 0.2 | 0.2 | 0.2 | 0.2 | 0.2 | 0.2 |
| Br calc. | % | 13 | 13 | 13 | 13 | 13 | 13 | 13 | 13 | 13 | 13 |
| synergist calc. | % | 4 | 5 | 4 | 5 | 4 | 5 | 4 | 5 | 4 | 5 |
| UL-94V @ 0.4 mm-rating | | V-0 | V-0 | V-2 | V-2 | V-2 | V-0 | V-2 | V-2 | V-0 | V-0 |
| UL-94V @ 0.8 mm-rating | | V-0 | V-0 | V-1 | V-1 | V-0 | V-1 | V-2 | V-2 | V-0 | V-0 |
| UL-94V @ 1.6 mm-rating | | V-0 | V-0 | V-1 | V-0 | V-0 | V-0 | V-0 | V-0 | V-0 | V-0 |
| Mechanical properties | | | | | | | | | | | |
| Izod notched impact | J/m | 81 | 74 | | | 86 | 84 | | | 74 | 73 |
| Tensile strength | Mpa | 139 | 131 | | | 157 | 153 | | | 141 | 137 |
| elongation at break | % | 2.7 | 3.2 | | | 2.7 | 2.9 | | | 3.6 | 3.6 |
| Tensile modulus | MPa | 11452 | 10330 | | | 11485 | 11770 | | | 11263 | 11225 |
| GWIT | C. | 900 | 900 | | | 875 | 875 | | | 875 | 875 |
| HDT | C. | 213 | 223 | | | 223 | 228 | | | 230 | 206 |
| MFI 270 C./1.2 kg | g/10 min | 11.3 | 9.6 | | | 11.6 | 6.17 | | | 11.3 | 10.3 |

TABLE 4

Compositions of Polyamide-6,6 & F-2400 & Synergists
(Summary of Flame-Retardancy and Evaluation of Mechanical Properties)

| | Units | REF-ATO | HDP | MPP | HDP + MPP | Exolit 1240 | Exolit 1312 |
|---|---|---|---|---|---|---|---|
| Polynil P50FL | % | 39.9 | 40.9 | 40.9 | 40.9 | 40.9 | 40.9 |
| GF Chop Vantage 3660 | % | 30 | 30 | 30 | 30 | 30 | 30 |
| F-2400 | % | 24.5 | 24.5 | 24.5 | 24.5 | 24.5 | 24.5 |
| AO-M0112 | % | 5 | — | — | — | — | — |
| HDP | % | — | 4 | — | 2 | — | — |
| MPP melapur 200 | % | — | — | 4 | 2 | — | — |
| Exolit 1240 | % | — | — | — | — | 4 | — |
| Exolit 1312 | % | — | — | — | — | — | 4 |
| Acrawax C ex. Lonza | % | 0.2 | 0.2 | 0.2 | 0.2 | 0.2 | 0.2 |
| Irganox B1171 ex Ciba | % | 0.2 | 0.2 | 0.2 | 0.2 | 0.2 | 0.2 |
| Ca-stearate | % | 0.2 | 0.2 | 0.2 | 0.2 | 0.2 | 0.2 |
| Br calc. | % | 13 | 13 | 13 | 13 | 13 | 13 |
| synergist calc. | % | 4 | 4 | 4 | 4 | 4 | 4 |
| UL-94 @ 1.6 mm | rating | V-0 | V-0 | V-0 | V-0 | V-1 | V-0 |
| UL-94 @ 0.8 mm | rating | V-0 | V-0 | V-2 | V-0 | V-1 | V-0 |
| UL-94 @ 0.4 mm | rating | V-0 | V-0 | NR | V-0 | V-2 | V-2 |
| Mechanical properties | | | | | | | |
| IZOD impact | [J/m] | 82.7 | 82 | 65.7 | 71.7 | 74.5 | 65.4 |
| Tensile Strength | [MPa] | 156 | 153 | 148 | 150 | | 133 |
| Tensile Modulus | [MPa] | 10,923 | 10,219 | 10,512 | 9,835 | | 9,492 |
| Elongation at Break | [%] | 3.7 | 3.1 | 3.3 | 3.6 | | 3.4 |
| GWIT | [° C.] | 925 | 900 | 900 | 900 | | 900 |
| HDT | [° C.] | 230.6 | 230.9 | 224.0 | 216.2 | | 201.8 |
| MFI | [g/10 min] | 13 | 8.5 | 55.4 | 36.4 | | 8.2 |

Results:
Flame-Retardancy of Compositions Containing FR-803P (TABLE 3):
ATO reference: 13% Br and 4% ATO was rated V-0 at all thicknesses.
MPP and Exolit 1314 compositions didn't perform well with FR-803P.
MPP/HDP (mixture): 13% Br and 4% MPP/HDP was rated V-0 at 1.6 & 0.8 mm but was rated V-2 at 0.4 mm.
13% Br and 5% MPP/HDP composition was rated V-0 at 1.6 & 0.4 mm but was rated V-1 at 0.8 mm.
Exolit 1312: with 13% Br and 4% Exolit 1312 was rated V-0 at all thicknesses.
Mechanical Properties of Compositions Containing FR-803P (TABLE 3):
Izod impact strength: MPP+HDP had a similar Izod impact as ATO, Exolit 1312 had lower Izod impact strength (10% reduction).
All the other properties were more or less the same.
Flame-Retardancy of Compositions Containing F-2400 (TABLE 4):
ATO reference: 13% Br and 4% ATO was rated V-0 at all thicknesses.
MPP and Exolit 1240 didn't perform well with F-2400.
Exolit 1312: 13% Br with 4% Exolit 1312 was rated V-0 at 1.6 & 0.8 mm but was rated V-2 at 0.4 mm.
MPP/HDP (mixture) didn't have any advantage over HDP alone.
HDP: 13% Br with 4% HDP was rated V-0 at all thicknesses.
Mechanical Properties of Compositions Containing F-2400 (TABLE 4):
Izod impact strength: HDP had a similar Izod impact as ATO. Exolit 1312 was lower (20%).
MFI: HDP and Exolit 1312 had lower MFI values compared to ATO, MPP had very high flow (probably due to decomposition).
Tensile and HDT: HDP had similar properties as ATO. Exolit 1312 had lower Tensile strength (15% reduction) and lower HDT value (12% reduction).

CONCLUSIONS

MPP+HDP (mixture) and Exolit 1312 showed good performance as ATO replacement in 30% polyamide-6,6 with FR-803P, the MPP+HDP mixture had an advantage in mechanical properties while Exolit 1312 showed a bit better flame-retardancy.

HDP showed the best overall performance as ATO replacement in polyamide-6,6 with F-2400, while maintaining good mechanical properties.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

The invention claimed is:
1. A flame retarded polyamide composition comprising:
   (a) at least one polyamide;
   (b) a hydroquinone bisdiphenyl phosphate ester of the general formula (I):

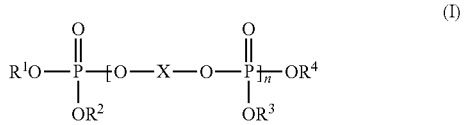

wherein $R^1$, $R^2$, $R^3$ and $R^4$ each independently is aryl, or arylalkyl each independently containing up to about 30 carbon atoms, optionally interrupted with heteroatoms, X is a divalent hydroquinone group, containing up to about 20 carbon atoms, and n has an average value of from about 1.0 to about 2.0;

(c) at least one brominated flame retardant and
(d) an anti-dripping agent, and optionally, melamine polyphosphate, and wherein the amount of components (b) is present in an amount of from about 5 to about 30 wt % and component (c) is present in an amount of from about 1 to about 40 wt %; and, wherein the amount of component (d) is present in an amount of from about 0.02 to 2 wt % said weight percent amounts being based on the weight of the flame retarded polyamide composition.

2. The flame retarded polyamide composition of claim 1 wherein the at least one polyamide(a) is selected from the group consisting polyamide-6, polyamide-6,6, polyamide-11, polyamide-12, polyamide-4,6, polyamide-6,10 and polyamide-6,12, and combinations thereof.

3. The flame retarded polyamide composition of claim 1, wherein the polyamide is polyamide-6,6.

4. The flame retarded polyamide composition of claim 1 wherein the hydroquinone bisdiphenyl phosphate ester of the general formula (I) is hydroquinone bis(diphenylphosphate).

5. The flame retarded polyamide composition of claim 1 wherein the at least one brominated flame retardant is a polymeric brominated flame retardant.

6. The flame retarded polyamide composition of claim 1 wherein the at least one brominated flame retardant is a polymeric brominated epoxy polymer.

7. The flame retarded polyamide composition of claim 1 wherein the at least one brominated flame retardant is decabromodiphenylethane.

8. The flame retarded polyamide composition of claim 1 wherein the at least one brominated flame retardant is brominated polystyrene.

9. The flame retarded polyamide composition of claim 1 wherein the at least one brominated flame retardant is selected from the group consisting of brominated polystyrene, polydibromo styrene, polytribromo styrene, polypentabromo styrene, decabromodiphenylethane, tetrabromodecabromodiphenoxybenzene, ethylenebistetrabromophthalimide, 2-ethylhexyl tetrabromophthalate ester, hexabromodiphenyl ether, octabromodiphenyl ether, decabromodiphenyl ether, tetrabromobisphenol A, tetrabromobisphenol A bis (2,3,-dibromopropyl ether), tris(tribromophenoxy)triazine, tris(tribromoneopentyl) phosphate, tetrabromodiphenyl sulfide, tetrabromobisphenol S bis(2,3-dibromopropyl ether), brominated polyacrylates, bis(tribromophenoxy)ethane, polydibromophenylene oxide, brominated phenoxy resin, epoxy terminated brominated phenoxy resins, end-capped brominated epoxy polymers sold under F-3000 series, brominated polycarbonate, phenoxy-terminated carbonate oligomer of tetrabromobisphenol A, and combinations thereof.

10. The flame retarded polyamide composition of claim 1 wherein the at least one brominated flame retardant is polypentabromo benzyl acrylate.

11. The flame retarded polyamide composition of claim 1 wherein the antidripping agent is selected from the group consisting of silicone oils, silica, asbestos, and fibrillating-type fluorine-containing polymers.

12. The flame retarded polyamide composition of claim 11 wherein the fibrillating-type fluorine-containing polymers are selected from the group consisting of poly(tetrafluoroethylene), tetrafluoroethylene/hexafluoropropylene copolymers, tetrafluoroethylene/ethylene copolymers, poly(vinylidene fluoride), poly(chlorotrifluoroethylene), and mixtures thereof.

13. The flame retarded polyamide composition of claim 1 further comprising filler.

14. The flame retarded polyamide composition of claim 13 wherein the filler is glass fiber.

15. The flame retarded polyamide composition of claim 1 further comprising an impact modifier.

16. The flame retarded polyamide composition of claim 1 further comprising a heat stabilizer and/or antioxidant.

17. A molded article comprising the flame retarded polyamide composition of claim 1.

18. The molded article of claim 17 wherein the molded article has a thickness of 0.8 mm and a flame retardancy of V-0.

19. The molded article of claim 17 wherein the molded article has a thickness of 0.4 mm and a flame retardancy of V-0.

20. The molded article of claim 17 wherein the molded article has a melt flow index of from 10 to 50.

* * * * *